United States Patent
Arslan

(10) Patent No.: US 10,826,640 B1
(45) Date of Patent: Nov. 3, 2020

(54) BASE SPREADING CODE DETERMINATION FOR A WIRELESS COMMUNICATION PROTOCOL

(71) Applicant: Silicon Laboratories Inc., Austin, TX (US)

(72) Inventor: Guner Arslan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/722,512

(22) Filed: Dec. 20, 2019

(51) Int. Cl.
*H04B 1/707* (2011.01)
*H04J 13/16* (2011.01)
*H04J 13/00* (2011.01)
*H04J 13/10* (2011.01)
*H04B 1/709* (2011.01)

(52) U.S. Cl.
CPC .............. *H04J 13/16* (2013.01); *H04B 1/709* (2013.01); *H04J 13/0055* (2013.01); *H04J 13/10* (2013.01)

(58) Field of Classification Search
CPC ...... H04J 13/0055; H04J 13/10; H04J 13/102; H04J 13/107; H04J 13/12; H04J 13/14; H04J 13/16; H04J 13/18; H04J 13/22; H04B 1/69; H04B 1/707; H04B 1/709
See application file for complete search history.

(56) References Cited

U.S. PATENT DOCUMENTS

| | | | |
|---|---|---|---|
| 10,623,225 B2 | 4/2020 | Cao et al. | |
| 10,637,705 B1 * | 4/2020 | Shattil | H04L 1/1861 |
| 2002/0044221 A1 * | 4/2002 | Okada | H04N 9/642 |
| | | | 348/558 |
| 2014/0177855 A1 * | 6/2014 | Polinske | H04R 25/554 |
| | | | 381/60 |

OTHER PUBLICATIONS

Silicon Labs, "AN0823: Configuring Peripherals for 8-Bit Devices in Simplicity Studio," Initial Revision: Feb. 2014, Last Revision: Sep. 21, 2017, 12 pages total.
Silicon Labs, "AN0822: Simplicity Studio™ User's Guide," Initial Revision: Feb. 2014, Last Revision: Jun. 2018, 40 pages total.
U.S. Appl. No. 16/722,545, filed Dec. 20, 2019, entitled "System, Apparatus and Method for Automatically Determining Configuration Parameters for Wireless Devices," by Robert Mark Gorday.
U.S. Appl. No. 16/722,568, filed Dec. 20, 2019, entitled "System, Apparatus and Method for Calculating Nominal Symbol Levels for Wireless Communication Sequences," by Guner Arslan.
U.S. Patent and Trademark Office, Office Action dated Jun. 23, 2020 in U.S. Appl. No. 16/722,568, 13 pages total.

* cited by examiner

Primary Examiner — Siu M Lee
(74) Attorney, Agent, or Firm — Trop, Pruner & Hu, P.C.

(57) ABSTRACT

In one aspect, a method includes: iteratively, for each of a plurality of code maps each formed based on one of a plurality of base spreading codes: determining, in a computing system, a plurality of metrics for the code map; and computing, in the computing system, a weighted sum for the code map based on at least some of the plurality of metrics. After this iterative operation, a first base spreading code associated with the weighted sum having an optimal value may be selected. This first base spreading code may be used to configure one or more wireless devices with the first base spreading code to cause the one or more wireless devices to communicate coded symbols using the first base spreading code.

20 Claims, 7 Drawing Sheets

US 10,826,640 B1

BASE SPREADING CODE DETERMINATION FOR A WIRELESS COMMUNICATION PROTOCOL

BACKGROUND

In wireless communication systems, messages to be sent from a transmitter to a receiver are encoded, modulated and sent as radio frequency (RF) signals. Upon receipt, the receiver downconverts and otherwise processes the RF signals, and demodulates and decodes the resulting information to obtain the original message. Different modulation schemes use different codings to map message bits onto so-called symbols, which in turn are formed of a plurality of chips.

To effect modulation and demodulation, message bits are mapped onto symbols of a given wireless communication protocol. Each protocol has a set of symbols that are used to encode information. The set of symbols is also referred to as a code map. In some cases, the symbols of the code map can be generated based on a single spreading code, called a base spreading code. It is desirable to determine an optimized base spreading code as communication efficiency is based in part on suitability of the code map. Since there can be a very large number of base spreading codes possible for a given wireless communication protocol, it is difficult to find an optimized spreading code.

SUMMARY OF THE INVENTION

In one aspect, a method includes: iteratively, for each of a plurality of code maps each formed based on one of a plurality of base spreading codes: determining, in a computing system, a plurality of metrics for the code map; and computing, in the computing system, a weighted sum for the code map based on at least some of the plurality of metrics. After this iterative operation, the method further may include selecting a first base spreading code associated with the weighted sum having an optimal value; and configuring a wireless device with the first base spreading code to cause the wireless device to communicate coded symbols using the first base spreading code.

In an embodiment, the method further comprises iteratively, for each of the plurality of code maps, permuting the base spreading code a plurality of times to obtain a plurality of codes of the code map. Determining the plurality of metrics may comprise determining a minimum distance between each of the plurality of codes of the code map and other codes of the plurality of codes of the code map. The method may further comprise maintaining a histogram of a number of pairs of the plurality of codes of the code map having the minimum distance. The method may further include calculating an average distance between each of the plurality of codes of the code map and the other codes of the plurality of codes of the code map.

In an embodiment, the method may further include: calculating an auto-correlation of each of the plurality of codes of the code map; and determining a side lobe metric of the auto-correlation of each of the plurality of codes. The method may further include identifying a longest run of logic one values or logic zero values in the plurality of codes of the code map. The plurality of metrics may include: a side lobe metric of an auto-correlation of each of the plurality of codes of the code map; a minimum distance between the plurality of codes of the code map; an average distance between the plurality of codes of the code map; and a longest run of consecutive bit values in the plurality of codes of the code map.

In an embodiment, the weighted sum comprises a sum of a first weighted value of the side lobe metric, a second weighted value of the minimum distance, a third weighted value of the average distance and a fourth weighted value of the longest run. The method may further include storing the first base spreading code in a hardware configurator, where in response to a user selection of a first modulation scheme for the wireless device, the hardware configurator is to include the first base spreading code in a configuration file and communicate the configuration file to the wireless device for storage in a non-volatile memory of the wireless device. In one implementation, the first base spreading code may be 0xC8DD7892H.

In another aspect, a non-transitory storage medium may store instructions that when executed enable a computing system to perform methods in accordance with the above discussion.

In yet another aspect, a wireless device includes: a radio frequency (RF) front end circuit to receive and process an RF signal received from an antenna; a digitizer coupled to the RF front end circuit to digitize the processed RF signal; a mixer to downconvert the digitized signal to a second frequency signal; a channel filter coupled to the mixer to channel filter the second frequency signal; and a selection circuit having a first input coupled to the channel filter, the selection circuit further having a plurality of outputs each to couple to one of a plurality of demodulators. In turn, the plurality of demodulators are coupled to the selection circuit, and the selection circuit is to route the channel filtered second frequency signal to a first demodulator of the plurality of demodulators based on a first configuration setting, the first demodulator to demodulate an incoming communication using a base spreading code. The wireless device may further include a non-volatile storage having at least one configuration file including the first configuration setting and the base spreading code. In one implementation the base spreading code is 0xC8DD7892H.

In an embodiment, the at least one configuration file is automatically generated by a hardware configurator in response to a plurality of user input parameters. The wireless device may permute the base spreading code a plurality of times to obtain a plurality of codes of a code map, and the first demodulator is to demodulate the incoming communication using the code map.

DETAILED DESCRIPTION

In various embodiments, techniques are provided to determine an optimal base spreading code for a wireless communication protocol. Such optimal base spreading code may have various properties that allow communication efficiency to be enhanced. As examples, an optimal base spreading code may be used to generate a code map that has at least some of the following properties: symbols are zero mean (equal numbers of logic zeros and logic ones); symbols are orthogonal to each other (having zero cross-correlation); a minimum Hamming distance across all symbols is large; and long runs of logic zeros and logic ones are avoided in each symbol. Each symbol of the code map also ideally has an auto-correlation that is non-zero only at one time index. In embodiments herein, a plurality spreading sequences can be generated and analyzed to determine an optimal base spreading code. In one embodiment, this optimal base spreading code may be determined using a cost function that takes into account at least some of the above metrics.

In an embodiment, a hardware computing system may execute a sequence of instructions stored in a non-transitory storage medium to generate a set of candidate code maps, determine metrics of these code maps, perform calculations, and based on these operations determine an optimal base spreading code for use for a given wireless communication protocol. In turn, this optimal base spreading code can be communicated to a hardware configurator, which may use the base spreading code when configuring one or more wireless devices that are to communicate using the wireless communication protocol associated with the optimal base spreading code.

Figure 1:
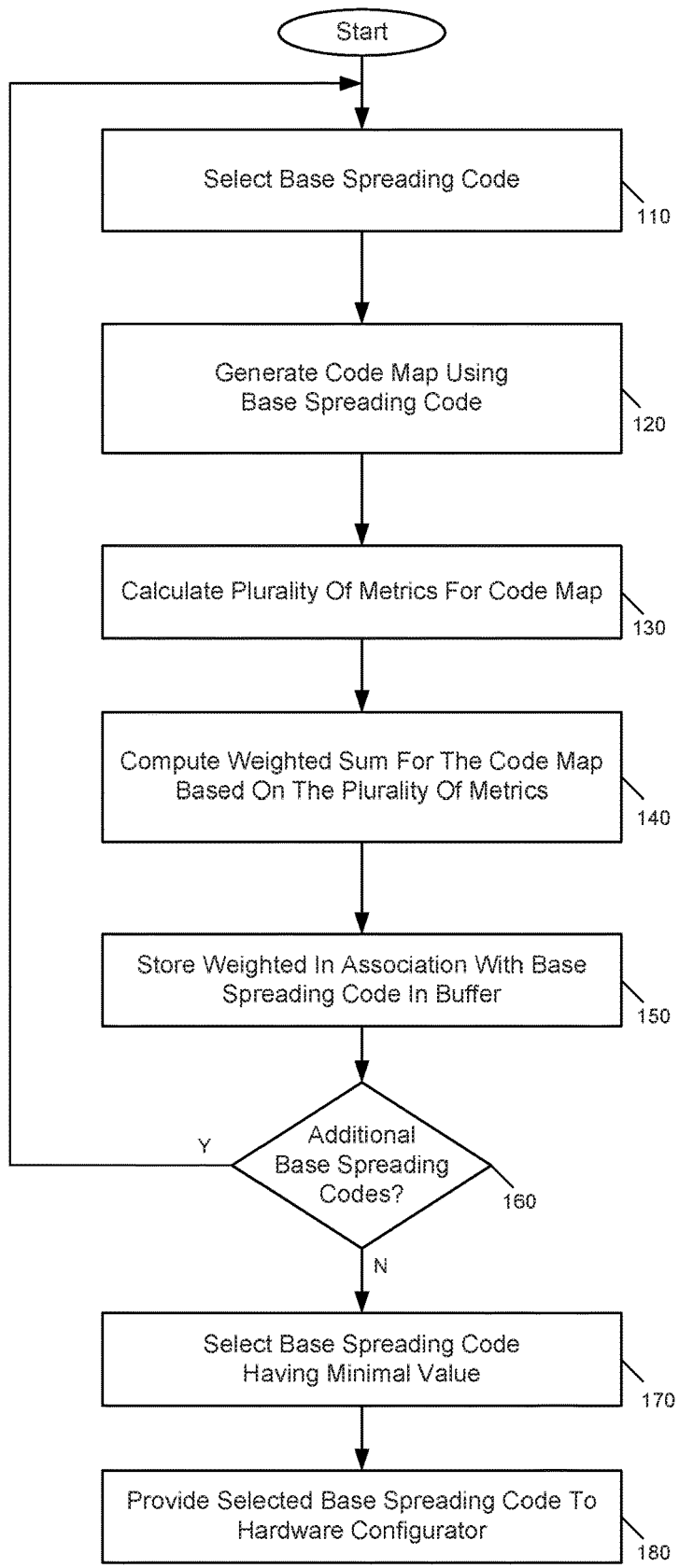
FIG. 1 is a flow diagram of a method in accordance with one embodiment.

Referring now to FIG. 1, shown is a flow diagram of a method in accordance with one embodiment. As shown in FIG. 1, method 100 is a high level method for determining a base spreading code for use for a given wireless communication protocol and providing the same to a hardware configurator. As such, method 100 may be performed by hardware circuitry, firmware, software and/or combinations thereof. In a particular embodiment, method 100 may be performed by a computing system that executes a sequence to implement an exhaustive search of a very large spreading code space to identify a most efficient spreading code for a wireless communication protocol. As an example, the wireless communication protocol may leverage an offset quadrature phase shift keying—direct sequence spreading spectrum (OQPSK-DSSS) modulation scheme. As one example protocol, namely the Zigbee standard, 4 bits are mapped onto 32 chip length symbols. Of course other protocols may use OQPSK-DSSS or other modulation schemes that map 4 bits onto 32 chip symbols. Understand that other protocols also may implement the teachings herein, and with different mapping of bits to symbols.

As illustrated, method 100 begins by selecting a base spreading code (block 110). This base spreading code may be a given base spreading code of all available spreading codes that meet a spreading code definition for the communication protocol. As an example, a wireless communication protocol such as the Z-Wave protocol provides spreading codes that are 32-bit values. This 32-bit value, which is one of a plurality of available symbols for the Z-Wave protocol, may be used to encode 4 bits of information. This is the case since the Z-Wave protocol provides a spreading factor of 8 in which 4 bits of information are encoded per symbol. Of course other spreading factors and bits per symbol may be present in other embodiments.

In any case, this base spreading code selection may be part of an exhaustive search. This exhaustive search may begin from a first value (e.g., all zeros) and proceed to a final value (e.g., all ones). Next, at block 120 a code map may be generated using the base spreading code. In an embodiment a code map may provide for 16 codes (symbols), where each symbol encodes 4 bits. In one embodiment, the base spreading code may be permuted by way of shifts, rotations, inversions or other manipulations to generate the 16 codes of the code map.

Still referring to FIG. 1, control then passes to block 130 where metrics may be calculated for the code map. Details of these metrics are described further below. Suffice to say, calculations and analyses may be performed using symbols of the code map to generate metrics. Thereafter at block 140 a weighted sum for the code map may be calculated based on at least some of these metrics. Next at block 150 this weighted sum may be stored in association with the base spreading code.

Still with reference to FIG. 1, control passes to diamond 160 to determine whether there are additional base spreading codes to be analyzed. If so, control passes to block 110, discussed above. Otherwise, control passes to block 170 where a base spreading code may be selected that has a minimum value for the weighted sum. Understand that it is possible for there to be a number of base spreading codes that have the same minimum value. In such cases, a given base spreading code can be randomly selected from these codes. Or various heuristics may be considered in determining which base spreading code having the same minimum value is to be selected. In one particular implementation, this base spreading code may have a value of 0xC8DD7892H (for an implementation using a 32-bit base spreading code). Such code may be an optimal base spreading code having desirable properties improved fidelity of wireless communication. In other cases, instead of selecting a base spreading code having an optimal minimum value, a base spreading code having an optimal maximum value may be selected, where a fitness function is used instead of a cost function.

Finally, at block 180 this selected base spreading code may be provided to a hardware configurator. As described herein, this hardware configurator may use the base spreading code in generating configuration settings for wireless devices. Accordingly, when a user indicates that a wireless device is desired to be configured for the communication protocol associated with this base spreading code, the base spreading code may be provided as one configuration setting for the wireless device.

When provided as a configuration setting from the hardware configurator to wireless devices (e.g., transmitters and receivers), a code map may be generated using this base spreading code. Thereafter modulation and demodulation operations may use this code map to generate symbols. Although shown at this high level in the embodiment of FIG. 1, many variations and alternatives are possible.

Figure 2A:
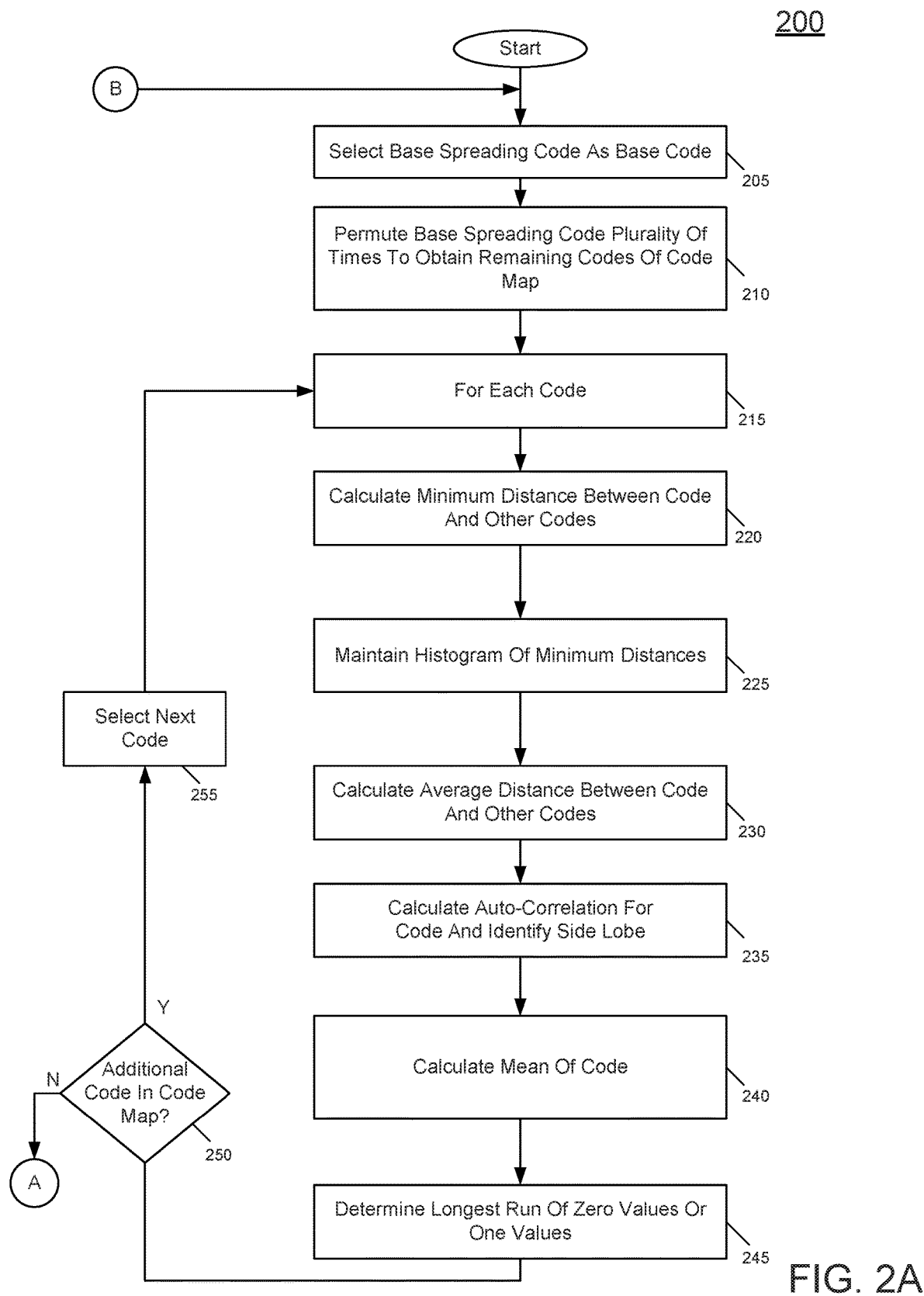
FIGS. 2A and 2B are flow diagrams of a method in accordance with another embodiment.
Figure 2B:
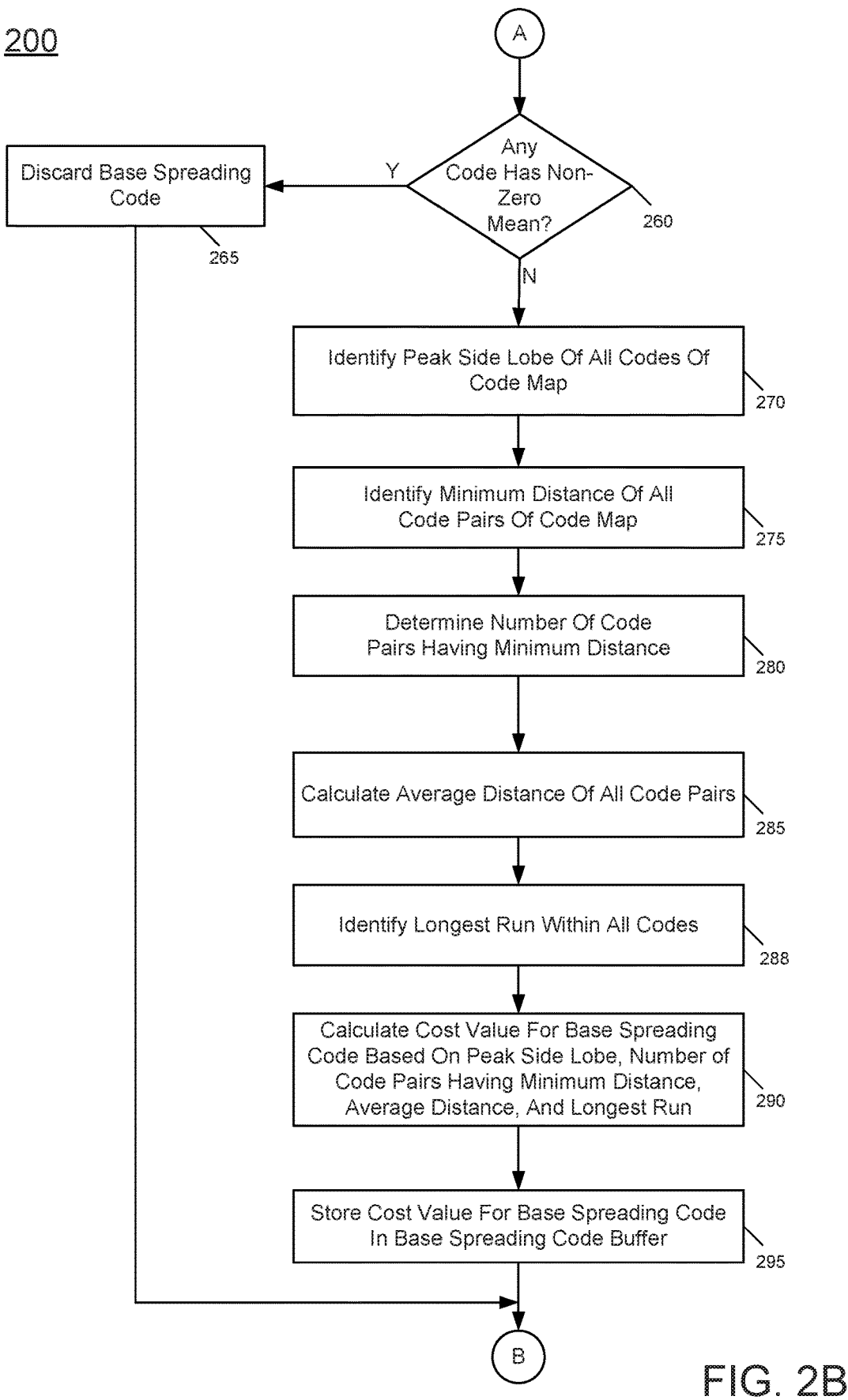

Referring now to FIGS. 2A-2B, shown is a flow diagram of a method in accordance with another embodiment. More specifically FIGS. 2A-2B show a flow diagram of operations performed in determining a base spreading code for a wireless communication protocol. As such, method 200 may be performed by hardware circuitry, firmware, software and/or combinations thereof. In a particular embodiment, method 200 may be performed by a computing system.

As illustrated, method 200 begins by selecting a given base spreading code as a base code (block 205). Understand that this base code is a first symbol of a code map. Next at block 210 the base spreading code may be permuted a plurality of times to obtain remaining codes (namely symbols) to form the code map. As one example, a permutation may include performing a 4-bit right shift operation a number of times to obtain at least some of the remaining codes, along with other permutations. In other cases, left shift rotations may be performed. Or another type of translation, or combinations of rotations, inversions or so forth may be performed, to generate the codes of the code map.

In any event, control passes to block 215 for the beginning of a for loop for each code of the code map. Note that when all possible base codes have been selected and used to generate code maps (at blocks 205 and 210), the for loop may terminate. As illustrated, various operations may be performed for each code. Beginning at block 220, a minimum distance may be calculated between the code and the other codes of the code map. At block 225 a histogram may be maintained of the number of code pairs having the minimum distance. At block 230, an average distance may be calculated between the code and all other codes of the code map.

Next at block 235, an auto-correlation may be calculated for the code. This auto-correlation is a correlation between the given code and the given code. As such, a single large peak is expected. Of course, since not all codes provide this ideal result, it is possible for there to be one or more side lobes having an undesirably large amplitude. As such, in addition to calculating the auto-correlation, a maximum side lobe of the auto-correlation can be identified. In other cases, additional side lobe metrics such as total side lobe power or side lobe-to-main lobe ratio may be calculated.

At block 240 a mean of the code may be calculated. As it is desirable for symbols to have a zero mean or DC balance (the same number of logic ones and zeros), this calculation may identify, in part, suitability of the resulting code for use. Finally, at block 240 the longest run of logic zero or logic one values within the code may be determined.

Still with reference to FIG. 2A, control next passes to diamond 250 to determine whether there are additional codes within the code map to be analyzed. If so, control passes to block 255 where the next code of the code map may be selected. Then the for loop beginning at block 205 may execute for another iteration.

Finally, when it is determined that the various operations have been performed for each code of a given code map, control passes to diamond 260 (now referring to FIG. 2B). Here it is determined whether any code within the code map has a non-zero mean. If so, the code map may be undesired for usage for a wireless communication protocol. As such control passes to block 265 where the base spreading code may be discarded from further consideration. Accordingly, control passes back to block 205 (of FIG. 2A) for selection of a next base spreading code. Note that diamond 260 may be an optional operation to enable faster operation. In some cases this determination may occur earlier in the method such that the base spreading code and resulting code map is discarded before calculating the above metrics. In yet another embodiment, this determination may be made as part of the cost function to enable selection of codes that have small but non-zero mean. In still other embodiments, other metrics can be moved from the cost function to a condition, to skip calculation of metric values for codes that do not satisfy the condition, which may increase speed. One such example may be to exclude base codes (and resulting code maps) that do not have at least a given minimum distance.

Still referring to FIG. 2B, if it is determined at diamond 260 that the code map has a zero mean, control passes to block 270. At block 270 a peak side lobe of all the codes of the code map may be identified (and stored in a buffer or other temporary storage). Then, at block 275 a minimum distance between all code pairs of the code map may be identified. Next at block 280, a number of the code pairs having this minimum distance may be determined. In an embodiment, a histogram may be maintained to keep track of the number of code pairs having this minimum distance. Next, at block 285 an average distance between all the code pairs may be calculated. Then at block 288 a longest run within all the codes of the code map may be identified (namely a longest run of consecutive logic ones or consecutive logic zeros). In another embodiment execution speed may be increased by performing a condition after each metric calculation. For example, after the peak side lobe calculation, the best value can be tracked and any code that does not have a side lobe peak at least as low as the best value can be ruled out, thus avoiding all other calculations for codes that will not result in the minimum value.

Still with reference to FIG. 2B, based on at least some of this information, a cost value may be determined for the base spreading code. More specifically, at block 290 a cost value may be calculated based at least in part on the peak side lobe, the number of code pairs having the minimum distance, the average distance, and the longest run. In an embodiment, a weighted sum may be calculated based upon a coefficient applied to each of these values. Particular coefficients may be based on heuristics, in an embodiment. In any event, control next passes to block 295 where a cost value for the base spreading code may be stored in a base spreading code buffer. More specifically, an entry may be included in this buffer that associates the base spreading code and its calculated cost value (e.g., weighted sum).

Figure 3:
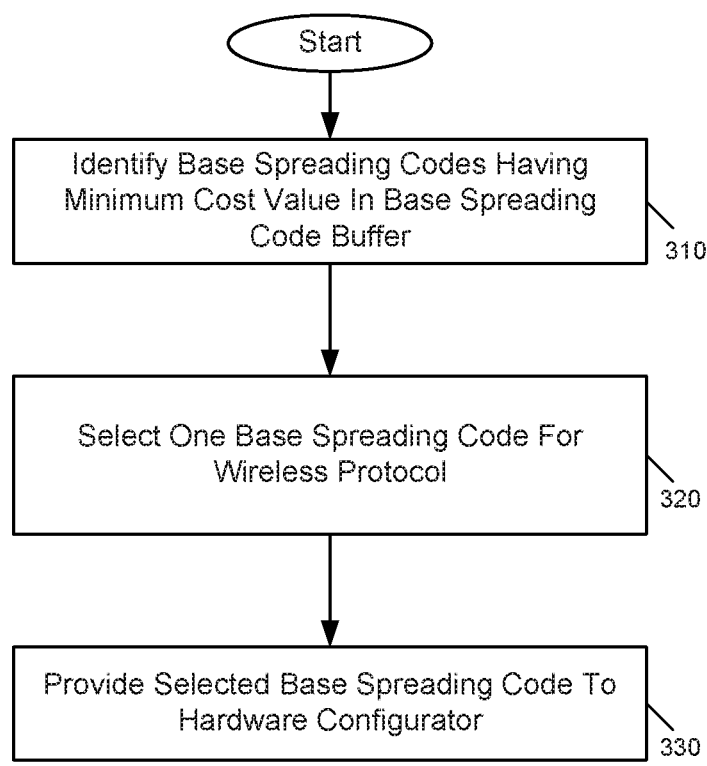
FIG. 3 is a flow diagram of a method in accordance with another embodiment.

Referring now to FIG. 3, shown is a flow diagram of a method in accordance with another embodiment. More specifically, FIG. 3 shows a method 300 for selecting a single base spreading code for a wireless communication protocol and providing this code to a hardware configurator. As such, method 300 may be performed by hardware circuitry, firmware, software and/or combinations thereof. In a particular embodiment, method 300 may be performed by a computing system.

As illustrated, method 300 begins by identifying one or more base spreading codes that have a minimum cost value (block 310). This is so, as it is very possible that there may be multiple, and potentially a large number of, base spreading codes having the same minimum cost value. As such, entries associated with this minimum cost value within the base spreading buffer can be identified to identify the corresponding base spreading codes. Then at block 320, a base spreading code from this group may be selected for a given wireless communication protocol. In some cases various heuristics may be applied in determining the base spreading code. For example, a location and nature of maximum runs or so forth may be considered in selecting an appropriate base spreading code. After selection of this code, it may be provided to a hardware configurator (block 330). For example, the base spreading code may be included within a hardware configurator, e.g., stored as a configuration setting. For example, a hardware configurator may include a register or other storage to store this value. Or the value may be stored within a set of instructions which, when executed, provide hardware configurator functionality. Understand that with this base spreading code, the hardware configurator can thereafter provide this value as a configuration setting for wireless devices that use the protocol. While shown at this high level in the embodiment of FIG. 3, many variations and alternatives are possible.

Figure 4:
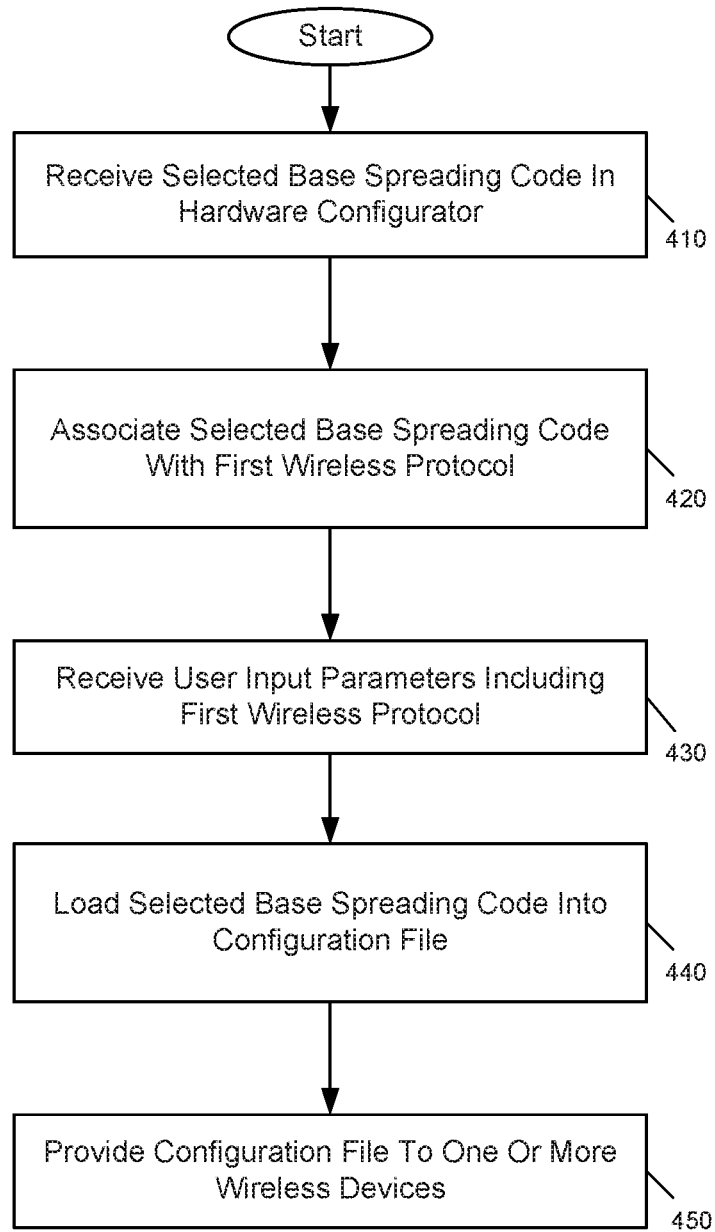
FIG. 4 is a flow diagram of a method in accordance with yet another embodiment.

Referring now to FIG. 4, shown is a flow diagram of a method in accordance with yet another embodiment. As shown in FIG. 4, method 400 is a method for configuring one or more wireless devices with a base spreading code. As such, method 400 may be performed by a hardware configurator, which may be implemented as hardware circuitry, firmware, software and/or combinations thereof. As seen, method 400 begins by receiving a selected base spreading code in a hardware configurator (block 410). As discussed above, this value may be provided to enable the hardware configurator to provide it to wireless devices during a configuration process. Next, at block 420 the hardware configurator may associate this selected base spreading code with a first wireless protocol. For example, the hardware configurator may associate this base spreading code with a Z-Wave wireless protocol. In this way, when a user selects the Z-Wave protocol for use within a given wireless device, the hardware configurator may cause this base spreading code to be provided to the wireless device, e.g., as one of a plurality of configuration settings for the device.

As illustrated further in FIG. 4, next at block 430 the hardware configurator may, during normal operation, receive user input parameters that include an identification of the first wireless protocol. As a result of this user selection of the first wireless protocol, the selected base spreading code may be loaded into a configuration file that the hardware configurator is preparing for delivery to one or more wireless devices. Finally, at block 450 the hardware configurator may provide the configuration file (which may include a large number of configuration settings) to the one or more wireless devices. Understand while shown at this high level in the embodiment of FIG. 4, many variations and alternatives are possible.

Understand that after determination of an optimal spreading code for a given wireless communication protocol, the code may be included in a specification for the protocol. With this publication of the spreading code, it may be used by all makers of hardware that manufacture devices supporting the protocol. As such, devices of different manufacturers can reliably communicate with each other by using the same code map (generated using the base spreading code) to code and decode messages.

Figure 5:
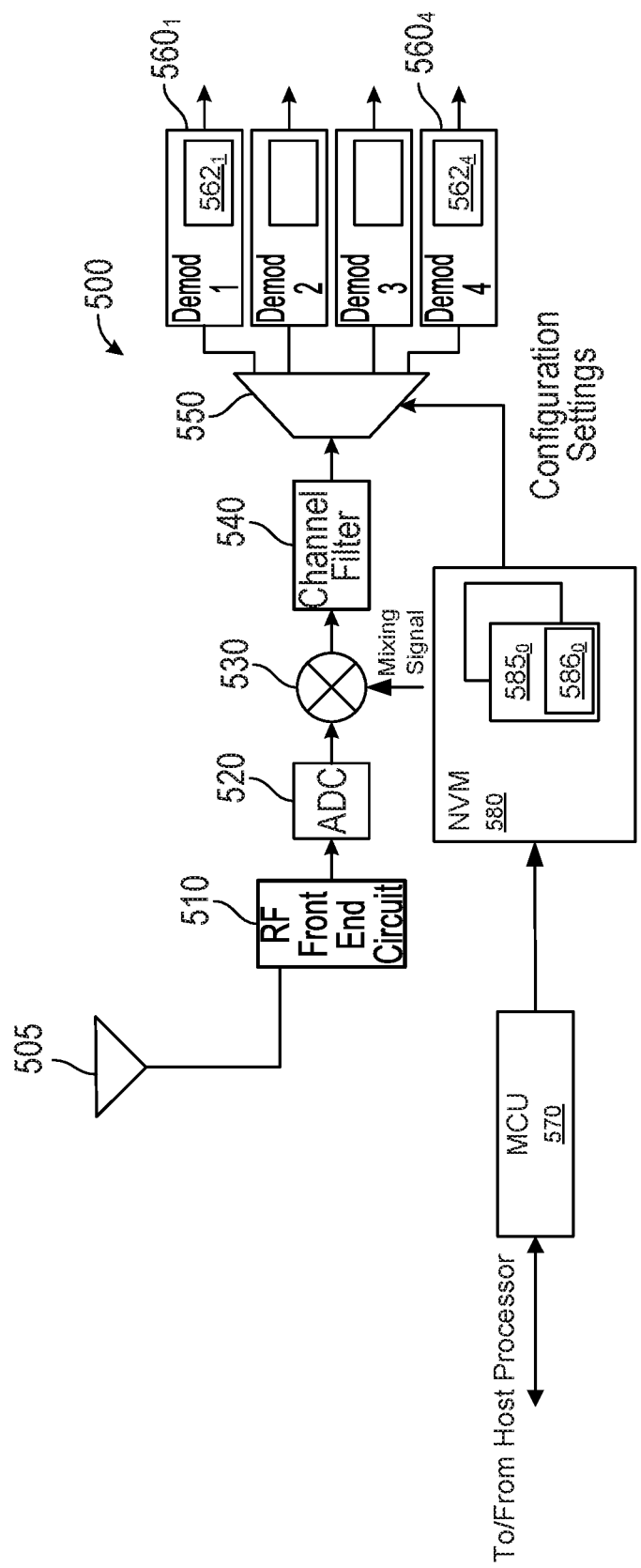
FIG. 5 is a block diagram of a wireless device in accordance with an embodiment.

Referring now to FIG. 5, shown is a block diagram of a wireless device in accordance with an embodiment. As shown in FIG. 5, wireless device 500 may be any type of device that can at least receive RF signals. In some cases, the device may be an IoT device that has both receive and transmit capabilities. For ease of discussion only a receiver portion of wireless device 500 is shown.

In the high level shown in FIG. 5, wireless device 500 receives incoming RF signals via an antenna 505. In turn, the incoming RF signals are provided to an RF front end circuit 510. RF front end circuit 510 may perform various processing such as gain control, e.g., using a low noise amplifier, additional gain stages, filtering and so forth. In turn, the processed RF signals are provided to a digitizer, implemented in the embodiment of FIG. 5 as an ADC 520, for digitization. In turn, digitized signals are provided to a mixer 530, which downconverts the RF signals to a lower frequency, e.g., an intermediate frequency baseband or so forth, using a mixing signal (which may be received from a frequency synthesizer, phase lock loop or so forth (not shown for ease of illustration in FIG. 5)). Although not shown in the high level of FIG. 5, understand that various additional components may be present in a receive path, such as one or more decimators, a DC filter, an IQ calibration circuit or so forth.

Still with reference to FIG. 5, after downconversion to a lower frequency, the resulting signals are provided to a channel filter 540 for channel filterization. After filtering, these signals are provided to a selection circuit 550 which may be implemented as a multiplexer to selectively provide the signals to one of multiple demodulators $560_1$-$560_4$. Each demodulator 560 may include a corresponding code map $562_{1,4}$ having a given set of symbols, which the demodulator or other circuitry of receiver 500 may generate using an optimized base spreading code, determined as described herein. Note that code maps 562 may be stored in a table or other storage for use in performing demodulation of incoming communications.

As shown in FIG. 5, selection circuit 550 may be controlled based on one or more configuration settings stored in a non-volatile memory 580. More specifically, these configuration settings may be present in one of multiple configuration files $565_{0-n}$ stored in non-volatile memory 580. These configuration files may be generated by a hardware configurator based on minimal user input parameters. In the embodiment shown, each configuration file 585 may include, as one configuration setting, a base spreading code $586_{0,n}$. Each spreading code 586 may be associated with a given wireless communication protocol, and may have been provided to the hardware configurator by a computing system that performed an embodiment to select an optimal base spreading code.

As further shown in FIG. 5, a microcontroller unit (MCU) 570 may couple to a host processor of wireless device 500. Based on control information from this host processor, which may include information for a desired wireless communication protocol, MCU 580 in turn may select an appropriate one of multiple configuration files 585 within non-volatile memory 580 for use in configuring selection circuit 550. In addition, various other configuration settings of the selected configuration file may be used for purposes of providing configuration values to configuration registers, providing control signals for additional circuitry of wireless device 500 and so forth. Understand while shown at this high level in the embodiment of FIG. 5, many variations and alternatives are possible.

Figure 6:
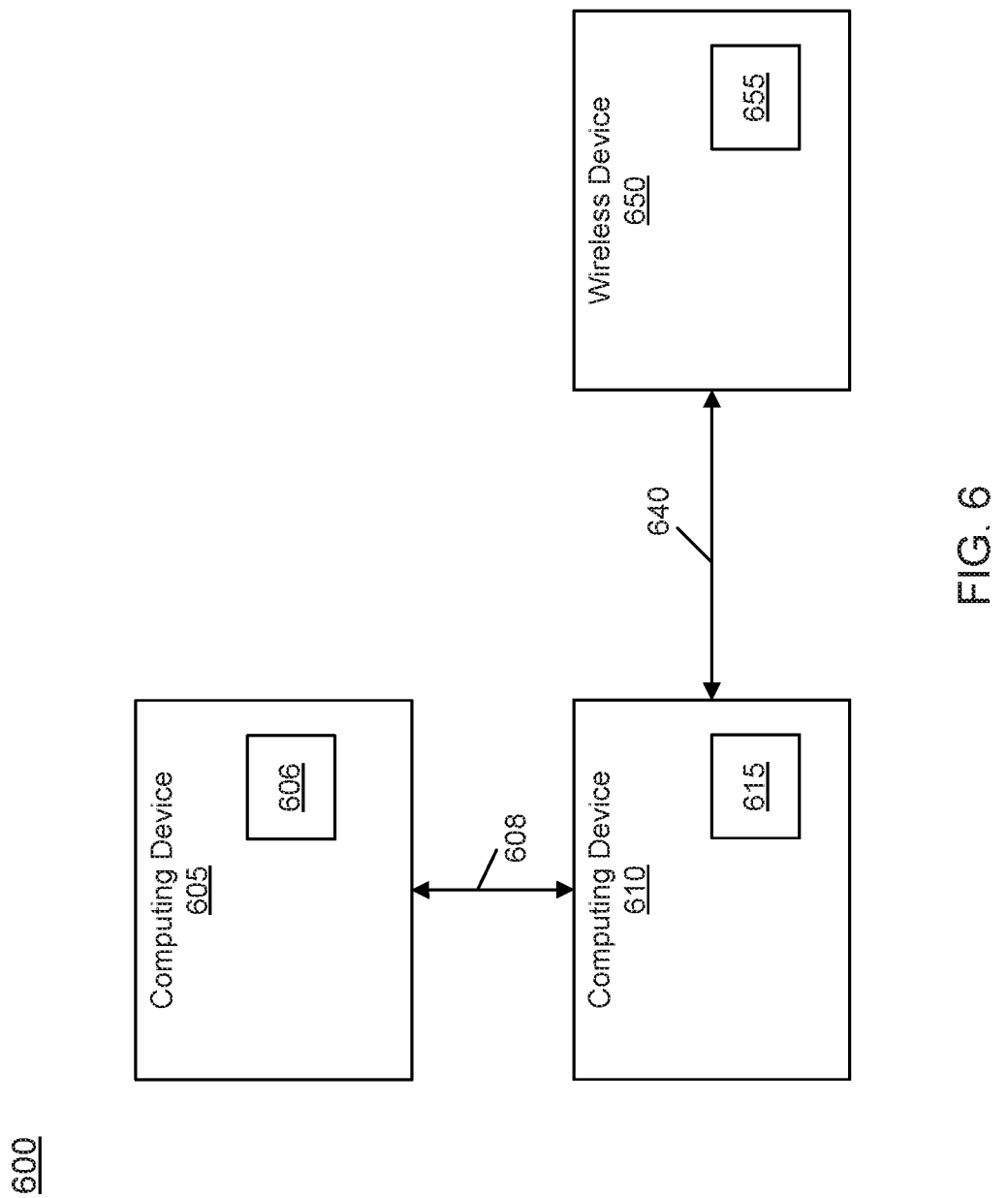
FIG. 6 is a block diagram of a configuration environment in accordance with an embodiment.

Referring now to FIG. 6, shown is a block diagram of a configuration environment in accordance with an embodiment. As shown in FIG. 6, configuration environment 600 includes a plurality of computing devices, including devices 605, 610. Computing devices 605, 610 may be any type of computer systems, ranging from a laptop or desktop computer, a server computer or even a smaller device such as a tablet or smartphone having a hardware configurator as described herein. Understand that a skilled worker such as a chip designer may use computing device 605 to determine an optimal base spreading code for one or more communication protocols using an embodiment as described herein. This code may then be provided to computing device 610 to be used by a hardware configurator for incorporation as a configuration setting for wireless devices. An end user may use computing device 610 to generate a configuration file for a wireless device, which may include this base spreading code.

Computing devices 605, 610 couple via an interconnect 608 (wired or wireless) and may include various circuitry including one or more processors, communication buses, memory, display and other input/output circuitry, including a user input mechanism such as a touch panel, keypad or so forth and other circuitry. Understand that with embodiments herein, an included memory and/or mass storage device (generally illustrated at items 606, 615) may include instructions stored in a non-transitory storage medium for execution to determine an optimal base spreading code, and/or to implement the hardware configurator. In embodiments, the one or more processors may execute such instructions to determine this code and/or implement this hardware configurator. In other cases, dedicated hardware circuitry may be provided to determine this code and/or implement the hardware configurator.

In any event, in execution, the hardware configurator may cause a series of graphical user interfaces (GUIs) to be displayed on a display device that allows the end user to select and/or input user input parameters for a variety of different features. As described above, the GUIs may provide for user input or selection of a variety of different user-defined parameters. Such parameters may include operational frequency, e.g., in the form of a base channel frequency and a channel spacing, crystal frequency information including a crystal frequency and accuracy. In addition, the GUIs may provide for input of modem information, including modulation type, bit rate, deviation, baudrate tolerance, and shaping filter information (e.g., of different types, including Gaussian, raised cosine or so forth). The GUIs may further provide for input of packet-based information including general frame information, frame length information (fixed and variable length frames), frame type, CRC information and so forth. In addition, frame contents, including preamble, syncword and payload information can also be provided. The GUIs may further provide for input of symbol coding information and channel coding information.

In some embodiments, the GUIs may further provide for advanced information that an expert user may input, while instead a novice user does not provide anything for these inputs and the hardware configurator may determine such information. Note that this advanced information input allows an experienced user to fine tune certain parameters. In addition, the configurator may allow an end user to overwrite certain determined parameters in a manner that allows downstream calculations to use the overwritten values.

In turn, the hardware configurator, based on this information can determine the wide number of configuration settings for a wireless device 650, including selection of an optimal base spreading code for use with one or mode modulators/demodulators. After a configuration file having such configuration settings is finalized and stored within computing device 610, it may be provided to wireless device 650 for storage in an included non-volatile memory 655. In different implementations, this configuration file may be provided to wireless device 650 via a wired or wireless interconnect 640. More specifically, the configurator may couple to wireless device 650, e.g., via a USB or other interface. For example an I2C, SPI, or another any protocol can be used for transmitting data. In some cases, the configuration file may be directly communicated to wireless device 650. This configuration file can also be updated wirelessly. For example, wireless device 650 can receive an update over the air and the rewrite non-volatile memory 650 with the new data. In other cases, once a customer has a specific image they could "image" it on their chips at production time or later, with multiple chips being imaged at once in a factory setting. Understand while shown at this high level in the embodiment of FIG. 6, many variations and alternatives are possible.

Note that embodiments may be used additionally by developers, debug engineers, validation and application engineers and so forth to generate configuration settings for use in performing simulations of a wireless device design. In addition, these expert users may further perform program design, debug and validation efforts on prototype silicon devices as well as testing manufactured integrated circuits.

In this way, a developer may continue to further develop a device's design when final configuration settings can be determined, even before a calculation is defined. For example, instead of fixing thresholds for packet detection, embodiments enable a dynamic, relative threshold determination in which a receiver can identify relative strength of peak signals when a packet is detected and floor signals in the absence of packet detection, and dynamically set a threshold at a scaling value of the peak signal (e.g., according to a configuration setting for the scaling factor).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   iteratively, for each of a plurality of code maps each formed based on one of a plurality of base spreading codes:
      determining, in a computing system, a plurality of metrics for the code map; and
      computing, in the computing system, a weighted sum for the code map based on at least some of the plurality of metrics;
   selecting a first base spreading code associated with the weighted sum having an optimal value; and
   configuring a wireless device with the first base spreading code to cause the wireless device to communicate coded symbols using the first base spreading code.

2. The method of claim 1, further comprising iteratively, for each of the plurality of code maps, permuting the base spreading code a plurality of times to obtain a plurality of codes of the code map.

3. The method of claim 2, wherein determining the plurality of metrics comprises determining a minimum distance between each of the plurality of codes of the code map and other codes of the plurality of codes of the code map.

4. The method of claim 3, further comprising maintaining a histogram of a number of pairs of the plurality of codes of the code map having the minimum distance.

5. The method of claim 3, further comprising calculating an average distance between each of the plurality of codes of the code map and the other codes of the plurality of codes of the code map.

6. The method of claim 2, further comprising:
   calculating an auto-correlation of each of the plurality of codes of the code map; and
   determining a side lobe metric of the auto-correlation of each of the plurality of codes.

7. The method of claim 2, further comprising identifying a longest run of logic one values or logic zero values in the plurality of codes of the code map.

8. The method of claim 2, wherein the plurality of metrics comprises:
   a side lobe metric of an auto-correlation of each of the plurality of codes of the code map;
   a minimum distance between the plurality of codes of the code map;
   an average distance between the plurality of codes of the code map; and
   a longest run of consecutive bit values in the plurality of codes of the code map.

9. The method of claim 8, wherein the weighted sum comprises a sum of a first weighted value of the side lobe metric, a second weighted value of the minimum distance, a third weighted value of the average distance and a fourth weighted value of the longest run.

10. The method of claim 1, further comprising storing the first base spreading code in a hardware configurator, wherein in response to a user selection of a first modulation scheme for the wireless device, the hardware configurator is to include the first base spreading code in a configuration file and communicate the configuration file to the wireless device for storage in a non-volatile memory of the wireless device.

11. The method of claim 1, wherein the first base spreading code comprises 0xC8DD7892H.

12. A non-transitory storage medium comprising instructions that cause a computing system to perform a method comprising:
  iteratively, for each of a plurality of code maps each formed based on one of a plurality of base spreading codes:
    determining, in the computing system, a plurality of metrics for the code map; and
    computing, in the computing system, a weighted sum for the code map based on at least some of the plurality of metrics;
  selecting a first base spreading code associated with the weighted sum having an optimal value; and
  communicating the first base spreading code to a hardware configurator to cause the hardware configurator to provide the first base spreading code to a wireless device to cause the wireless device to communicate coded symbols using the first base spreading code.

13. The non-transitory storage medium of claim 12, wherein the method further comprises iteratively, for each of the plurality of code maps, permuting the base spreading code a plurality of times to obtain a plurality of codes of the code map.

14. The non-transitory storage medium of claim 13, wherein the method further comprises:
  determining a minimum distance between each of the plurality of codes of the code map and other codes of the plurality of codes of the code map; and
  maintaining a histogram of a number of pairs of the plurality of codes of the code map having the minimum distance.

15. The non-transitory storage medium of claim 13, wherein the method further comprises:
  calculating an auto-correlation of each of the plurality of codes of the code map; and
  determining a side lobe metric of the auto-correlation of each of the plurality of codes.

16. The non-transitory storage medium of claim 13, wherein the plurality of metrics comprises:
  a side lobe metric of an auto-correlation of each of the plurality of codes of the code map;
  a minimum distance between the plurality of codes of the code map;
  an average distance between the plurality of codes of the code map; and
  a longest run of consecutive bit values in the plurality of codes of the code map.

17. The non-transitory storage medium of claim 16, wherein the method further comprises:
  computing the weighted sum comprising a sum of a first weighted value of the side lobe metric, a second weighted value of the minimum distance, a third weighted value of the average distance and a fourth weighted value of the longest run.

18. A wireless device comprising:
  a radio frequency (RF) front end circuit to receive and process an RF signal received from an antenna;
  a digitizer coupled to the RF front end circuit to digitize the processed RF signal;
  a mixer to downconvert the digitized signal to a second frequency signal;
  a channel filter coupled to the mixer to channel filter the second frequency signal;
  a selection circuit having a first input coupled to the channel filter, the selection circuit further having a plurality of outputs each to couple to one of a plurality of demodulators;
  the plurality of demodulators coupled to the selection circuit, wherein the selection circuit is to route the channel filtered second frequency signal to a first demodulator of the plurality of demodulators based on a first configuration setting, the first demodulator to demodulate an incoming communication using a base spreading code; and
  a non-volatile storage including at least one configuration file, the at least one configuration file including the first configuration setting and the base spreading code, wherein the base spreading code comprises 0xC8DD7892H.

19. The wireless device of claim 18, wherein the at least one configuration file is automatically generated by a hardware configurator in response to a plurality of user input parameters.

20. The wireless device of claim 18, wherein the wireless device is to permute the base spreading code a plurality of times to obtain a plurality of codes of a code map, and wherein the first demodulator is to demodulate the incoming communication using the code map.

* * * * *